Jan. 18, 1966  E. B. ELLIS ETAL  3,229,739
AUTOMATIC EGG BREAKING AND OPENING APPARATUS
Filed May 8, 1963  6 Sheets-Sheet 2

INVENTORS.
Earle B. Ellis
Carl E. Chesney
BY
Scofield, Kohjer, Scofield & Lowe
ATTORNEYS.

INVENTORS.
Earle B. Ellis
Carl E. Chesney

INVENTORS.
Earle B. Ellis
Carl E. Chesney

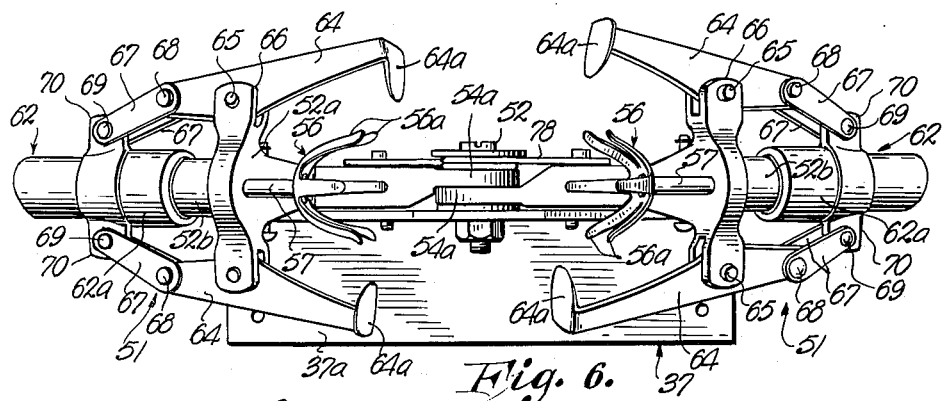
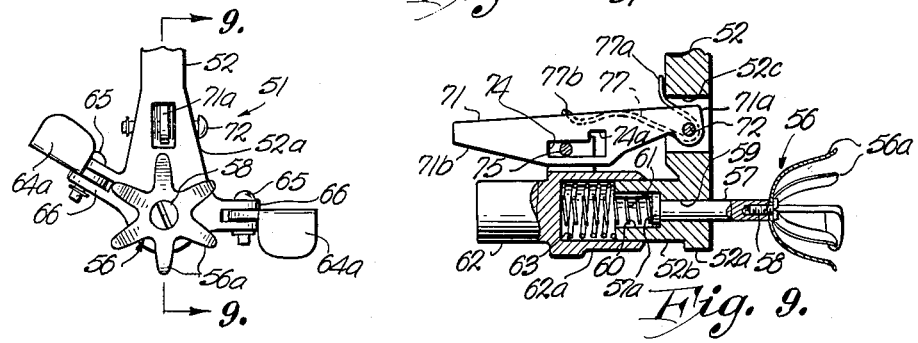
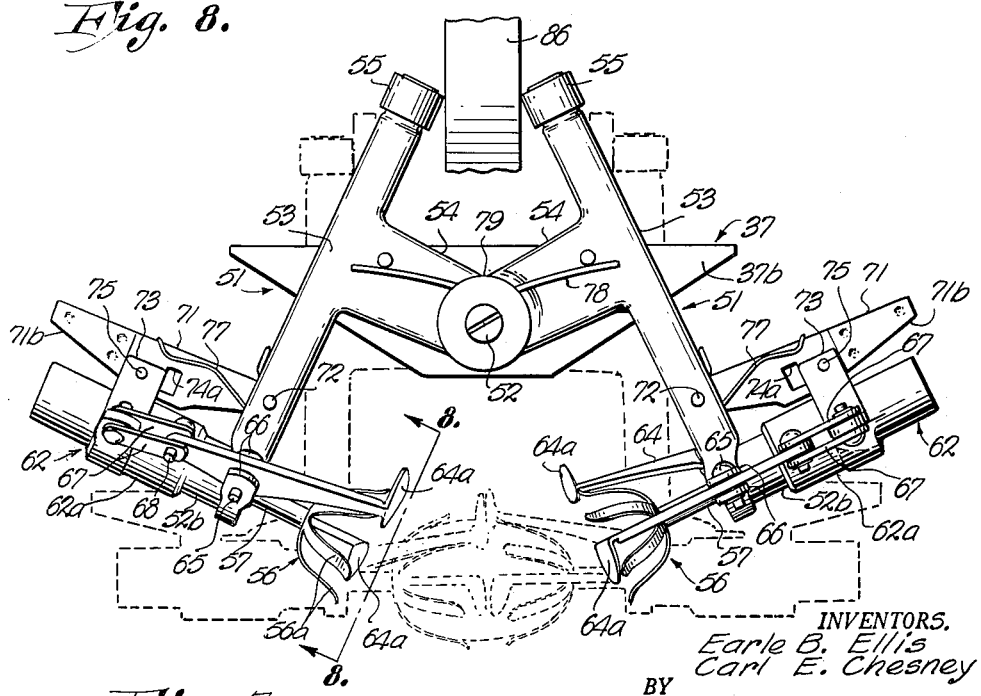

United States Patent Office 3,229,739
Patented Jan. 18, 1966

3,229,739
AUTOMATIC EGG BREAKING AND OPENING
APPARATUS
Earle B. Ellis, Mission, and Carl E. Chesney, Kansas City, Kans., assignors to Standard Brands Incorporated, New York, N.Y., a corporation of Delaware
Filed May 8, 1963, Ser. No. 278,841
11 Claims. (Cl. 146—2)

This invention relates generally to an apparatus for processing eggs and refers more particularly to the provision of improved apparatus for breaking and opening eggs to release the contents thereof.

One of the principal objects of the invention is to provide apparatus of the character described through which eggs are fed in serial fashion and which has a throughput rate which measurably exceeds that of other proposed apparatus of this type of which we are aware.

Another important object of the invention is to provide high speed apparatus of the character described in which the manner of handling of the eggs is such that, despite the high operating speed, the egg contents are released and can be collected without difficulty and with low frequency of yolk breakage.

A further object of the invention is to provide apparatus of the character described in which the handling of the eggs from reception of the whole egg to discharge of the emptied shell sections is carried out automatically and in which the manipulation of the whole eggs is accomplished with little, if any, danger of premature shell breakage and loss of egg contents.

Still another object of the invention is to provide apparatus of the character described in which synchronization of the feed rate with the operation of the breaking and opening means is obtained with ease and facility.

Yet another object of the invention is to provide apparatus having the foregoing advantages and which has a low horsepower requirement for continuous operation.

Yet another object of the invention is to provide apparatus of the character described in which accurate operation is and can be achieved without the need for complex, expensive, carefully machined parts.

Still another object of the invention is to provide apparatus of the character described in which there is little likelihood of contamination of the liquid egg contents by shell fragments and which permits continuous collection of the emptied shell fragments for such further processing as may be desired.

A further object of the invention is to provide egg handling apparatus of the character described which is relatively compact in size and which requires little maintenance.

Other and further objects of the invention together with the features of novelty appurtenant thereto will appear in the course of the following description.

In the accompanying drawings which form a part of the specification and are to be read in conjunction therewith and in which like reference numerals indicate like parts in the various views;

FIG. 6 is an enlarged plan view of a pick-up and breaking unit in the open position, the unit being disassociated from the remainder of the apparatus;

FIG. 7 is an elevational view of the unit of FIG. 6, being taken from above FIG. 6;

FIG. 8 is a fragmentary view taken along line 8—8 of FIG. 7 in the direction of the arrows;

FIG. 9 is a sectional view taken along line 9—9 of FIG. 8 in the direction of the arrows;

Figure 1:
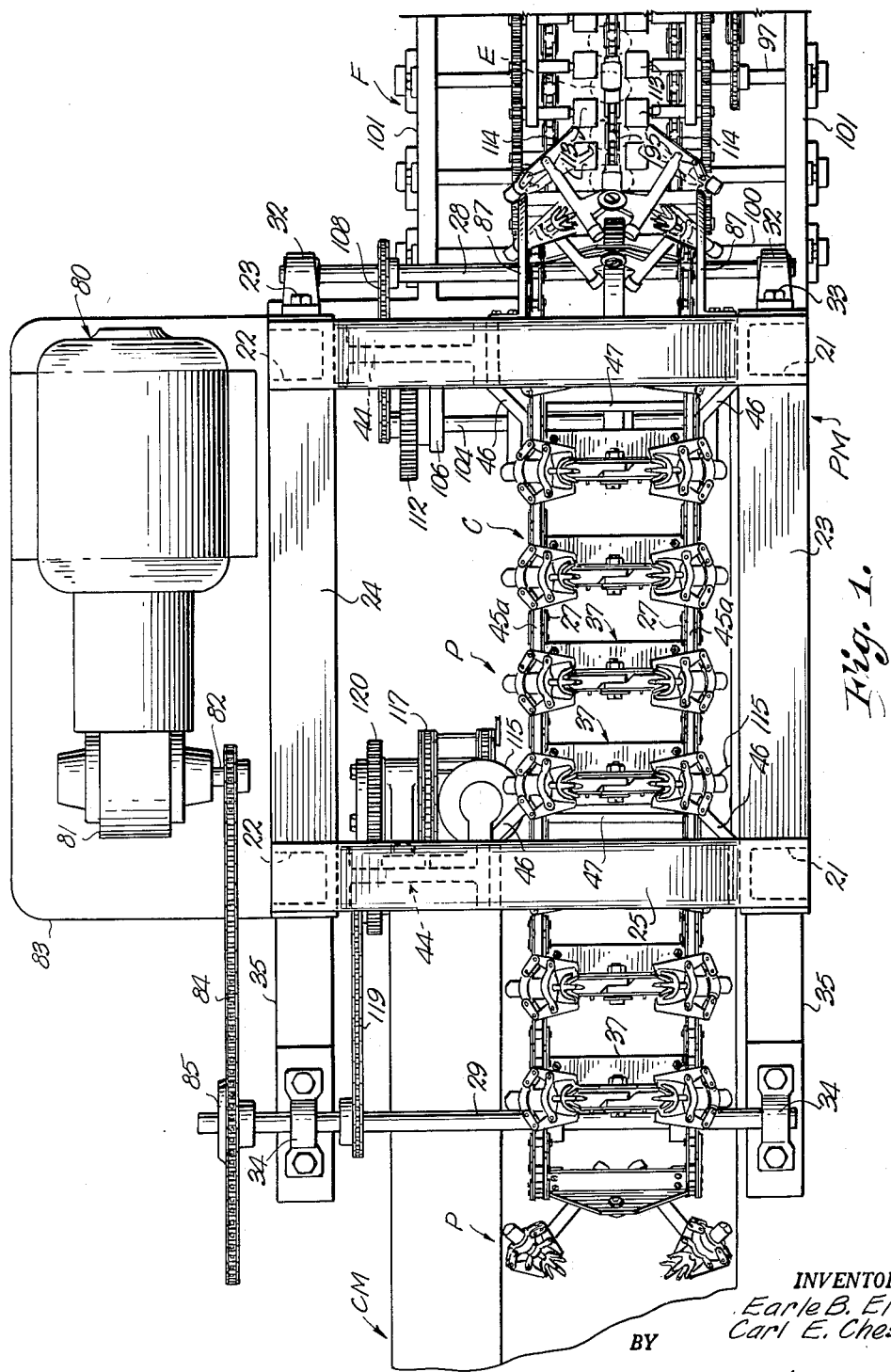
FIG. 1 is a top plan view of an egg breaking and opening unit embodying our invention, being shown in conjunction with fragments of egg feeding and further processing equipment for purposes of illustration.
Figure 2:
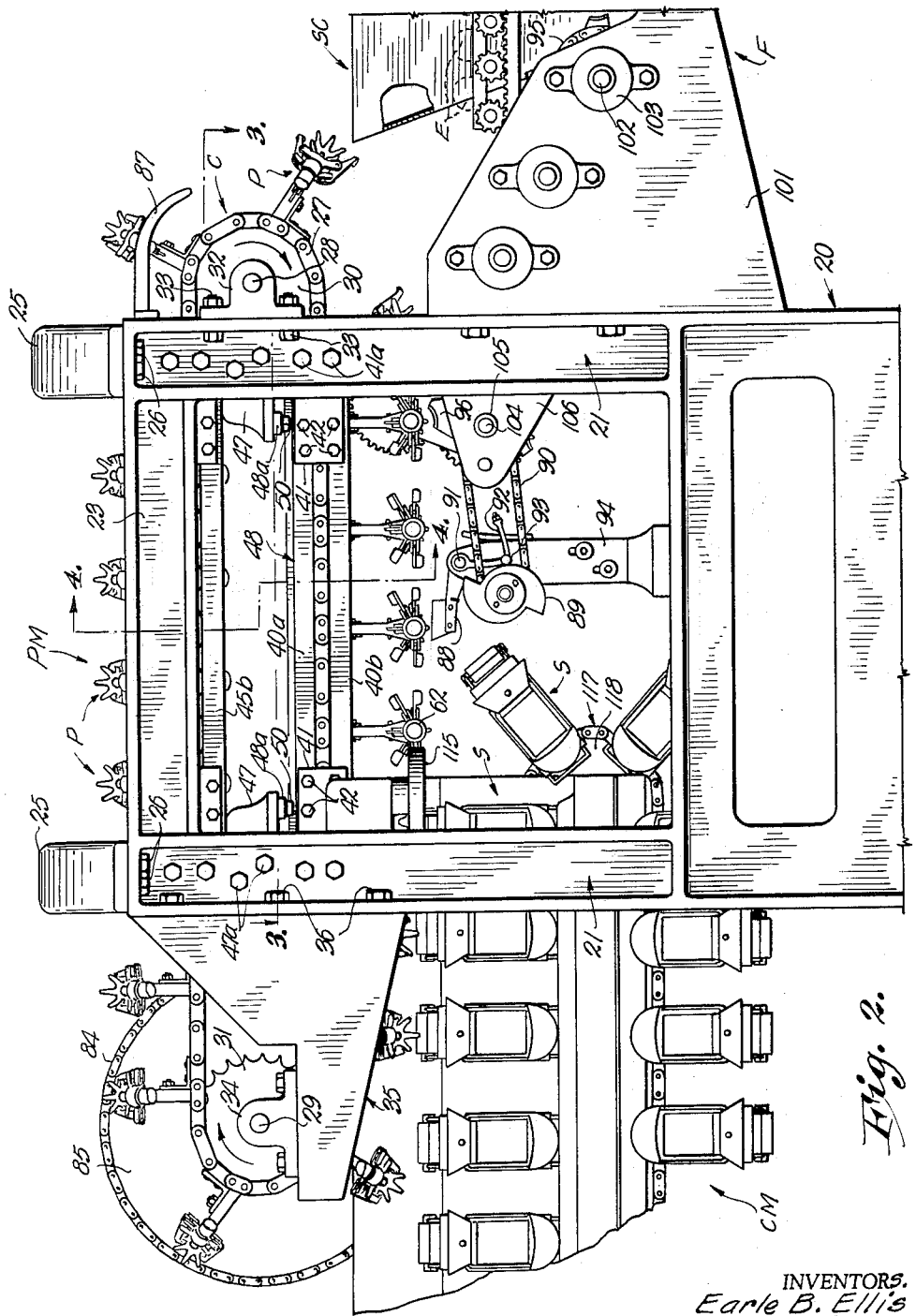
FIG. 2 is a side elevational view of same.

Referring to the drawings and initially to FIGS. 1 and 2, generally speaking the apparatus of the instant invenvention comprises the egg-handling mechanism PM having as its principal operating components the individual egg pick-up breaking and opening units P mounted serially on an endless carrier C. The carrier moves in a generally clockwise direction, having elongate upper and lower flights, and as it progresses the units P serve to successively pick up eggs E delivered single file by a conveying and positioning unit F. The eggs are moved horizontally from the unit F toward a separating mechanism CM having collectors S which move with and beneath the units P for a portion of the movement of the latter. As will subsequently be seen, during the movement of the eggs toward the collectors in the units P and as the eggs are advanced over the collectors, the egg shells are fractured and separated so as to drop the contents of each egg into a corresponding collector S. Once the contents have been separated from the shells, the shells are turned back over the top of the apparatus where the empty shell fragments are discharged to a shell collector SC. Once rid of the shell, each unit P is then advanced back toward the original pick-up position and the cycle of operation is repeated.

The details of construction of the infeeding, conveying and positioning mechanism F and the separating mechanism CM are embraced in other applications and except to the extent indicated later herein, those details play no part in the invention of this application. The feeding and positioning mechanism F is disclosed in detail in our application Serial 278,153, filed May 6, 1963, while the separating mechanism is disclosed in detail in our application Serial 280,918 filed May 16, 1963. As will become evident, other equipment having the same general purpose and end result but differently constructed can be employed with the central pick-up, breaking and separating apparatus PM.

The central apparatus PM is conveniently supported by a framework including the base 20 which may be of any convenient rigid construction. We have shown only a fragment of the base structure, but it will be understood that it is of the type adapted to rest on a floor or foundation and support the unit at a satisfactory working level. The base structure 20 is generally rectangular in plan and supports four corner posts, those on the near side (as viewed in FIGS. 1 and 2) bearing reference numeral 21 and on the far side 22. The upper ends of the respective pairs of corner posts 21, 22 are joined by beams 23, 24. Upwardly arched transverse top cross braces 25 extend between and are secured to the end pairs of corner members, as by bolts 26 which are threaded into suitably tapped apertures (not shown) in the end portions of the cross braces resting upon the corner members.

Figure 3:
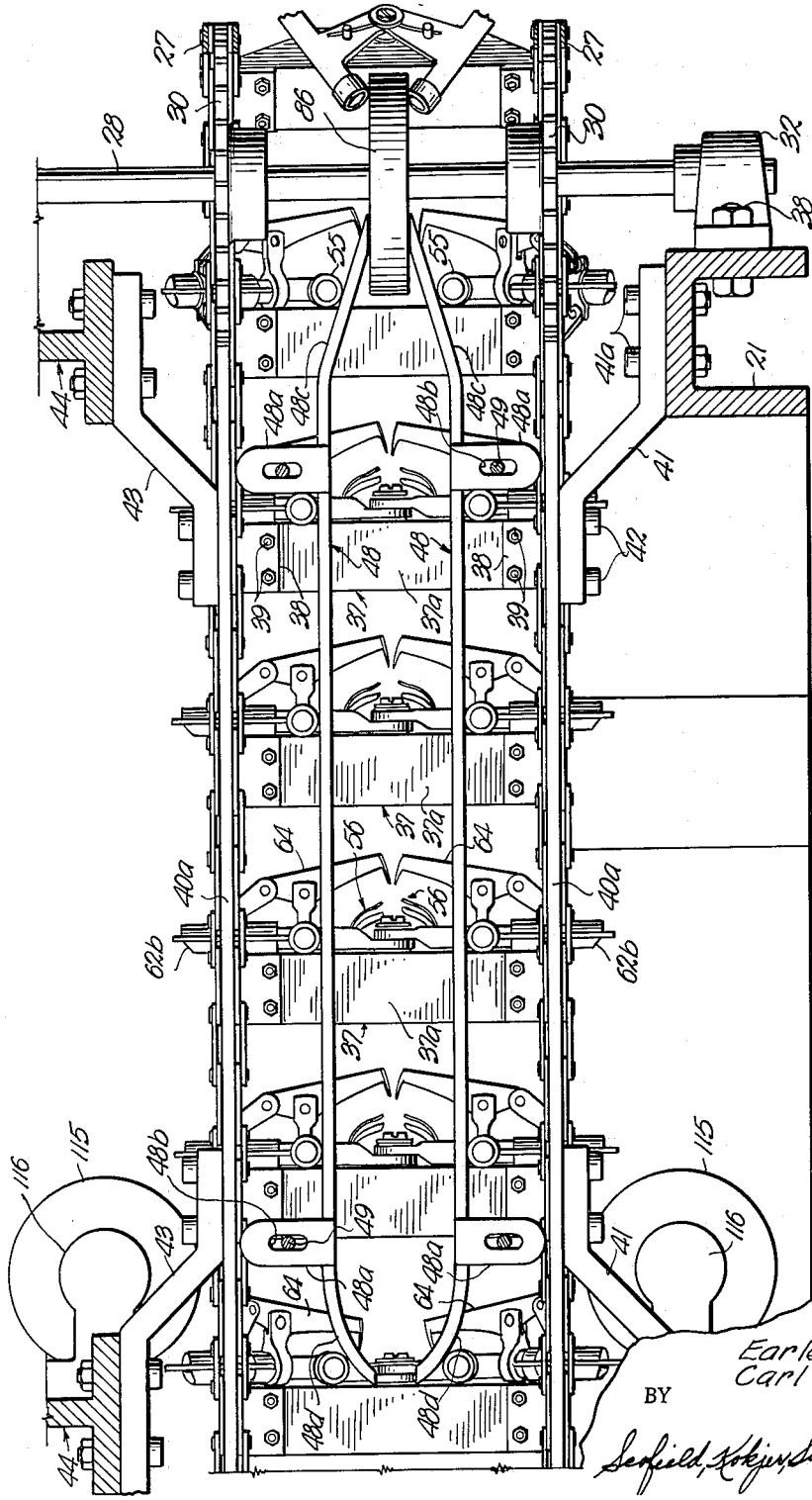
FIG. 3 is an enlargd fragmentary sectional view taken along line 3—3 of FIG. 2 in the direction of the arrows.

The endless carrier C, which supports and carries the serially mounted units P, is positioned between the corner posts 21, 22, although, as seen in FIGS. 2 and 3, it is closer to the near posts 21. The carrier unit comprises a pair of endless roller link chains 27 which are arranged in generally parallel vertical planes and extend between sprockets mounted on the spaced shafts 28, 29. For purposes of description, shaft 28 will be identified as the front shaft and shaft 29 as the rear shaft, the terms front and rear being selected in the context of the direction of the movement of the eggs as they progress from the feeding and positioning mechanism F toward the separating mechanism CM. The sprockets on front shaft 28 bear reference numeral 30 while those on the rear shaft 29 bear reference numeral 31.

Front shaft 28 is journaled in spaced bearings 32 which are secured to front corner posts 21, 22 by any suitable means, for example, bolts 33. The rear shaft 29 is similarly journaled in bearings 34. These are supported on structural members 35 which extend in cantilever fashion from the rear corner posts 21, 22, being secured thereto by bolts 36.

The parallel chains 27 are connected together by a plurality of spaced, identical cross members 37 of angle cross section which are spaced at uniform intervals along the chains. One leg 37a of each cross member is secured at its ends to the respective chains by brackets 38 and fasteners 39. The other leg 37b projects outwardly and, as subsequently will be seen, provides in each case the means of connecting a unit P with the carrier C.

As is evident, the carrier C is so arranged that it has upper and lower flights of substantial length. The lower flight of the carrier is maintained in a horizontal plane by supporting the lower flight of each of the chains 27 for horizontal movement in the vertical gap between upper and lower guide rails 40a, 40b, respectively. As best seen in FIGS. 2 and 3, the rails on the near side of the unit are supported by brackets 41 which are secured to the corner posts 21 by bolts 41a and extend angularly inwardly to connect with the rails by means of bolts 42. The rails on the far side are supported in similar fashion by like brackets 43, but because of the offset of the carrier C toward the near side, the brackets 43 are not connected directly with the far side corner posts, but to the inner ends of spacer members 44 which are cantilevered from the insides of the far posts 22. Similar pairs of spaced upper and lower rails 45a, 45b serve to guide the upper flights of the chains 27. These rails are similarly supported by brackets 46 secured respectively to the near corner posts 21 and the spacers 44 extending from the far posts 22.

Positioned between the upper and lower flights of chains 27 and extending tranversely between the front corner post 21 and its associated inner spacer member 44 and between the rear corner post 21 and its associated spacer member 44 are similar hanger members 47. These are secured at their respective ends to the corner posts and spacer members, as by bolts 47a. The hangers 47 provide means for carrying the symmetrically arranged curved bars 48 which, as will subsequently be seen, taken together, define a generally boat-shaped cam which provides important functions in connection with the operation of the units P as they move along the lower flight of the carrier C. It suffices to note at this point that the camming bars 48 are suspended beneath the hangers, each bar having a pair of horizontal ears 48a which have slots 48b therein through which extend threaded studs 49 depending from the hanger members. Nuts 50 are threaded on the studs 49 to complete the suspension connection. The elongate slots provide for lateral adjustment of the camming bars within defined limits, adjustment being made by loosening the nuts 50, adjusting the position of the bar and retightening the nuts.

Turning now to the description of the units P and referring additionally to FIGS. 6–9 inclusive, each unit comprises a pair of pivotal elements 51 arranged on a common pivot defined by the slotted head bolt 52. The bolt 52 serves to connect the elements 51 to the outwardly projecting leg 37b of the carrier cross pieces 37. The elements 51 are identical in construction although oriented at 180° with respect to each other and, therefore, only one will be described in detail.

Each element 51 comprises a main body having the elongate shank portion 53 having integral therewith the laterally extending projection 54. Projection 54 terminates at its outer end in a flattened portion 54a which is apertured to receive the pivot bolt 52. At one end the shank is provided with the rotatably supported roller 55. The other end of the shank carries the egg pick-up and shell holding and supporting components including the multiple finger egg end contacting cage 56.

The cage 56 is preferably stamped and formed from a springy metallic sheet and has the petal-like resilient fingers 56a arranged in concave fashion to engage the end portion of an egg. The cage is mounted to the end of a rod 57 by means of a machine screw 58 threaded axially into the rod. The rod extends in a slidable fit into a bore 59 in the enlarged lower end 52a of the shank 52 and terminates in an enlarged head 57a. The head 57a is located in an enlarged counter bore 60 and is normally seated against the annular shoulder between the counter bore 60 and bore 59 by a light compression spring 61.

Figure 4:
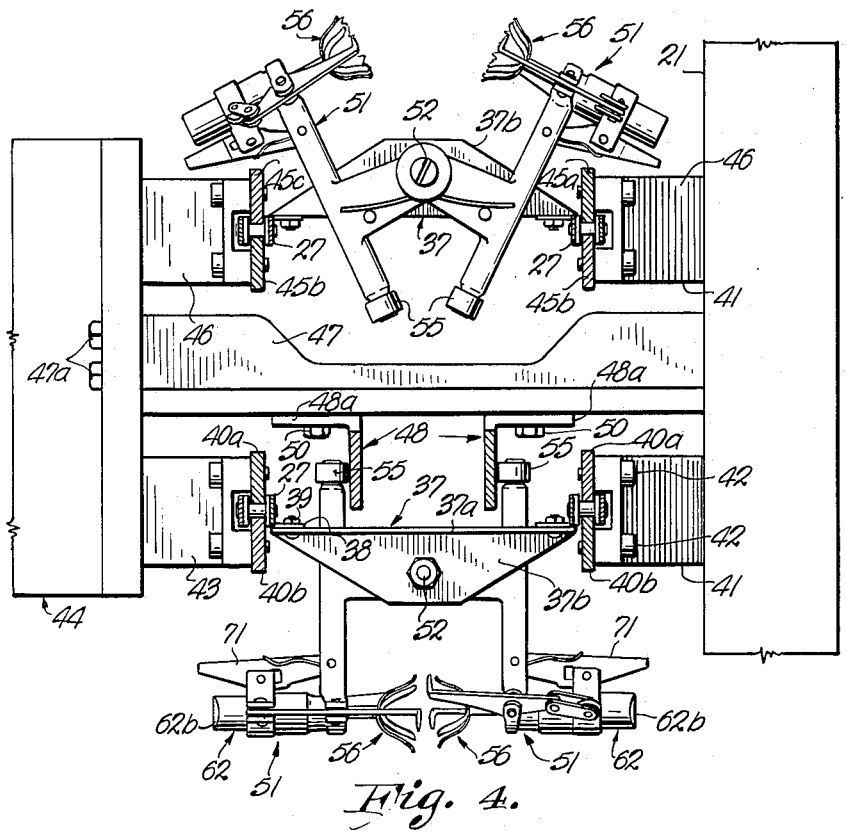
FIG. 4 is an enlarged generally sectional view taken along line 4—4 of FIG. 2 in the direction of the arrows.

It will be noted that counter bore 60 is axially disposed within a cylindrical boss 52b formed on the enlarged portion 52a of the shank 52. This boss has telescoped over it the sleeve-like portion 62a of the plunger member 62. For reasons subsequently to be explained, the outer end of the plunger 62 is provided with a beveled facet 62b (FIG. 4). A second, larger diameter and heavier compression spring 63 is located within the sleeve portion 62a of the plunger and this, along with the smaller spring 61 (although spring 63 serves as the major force) biases the plunger toward the extended position of FIG. 9 relative to the boss.

The plunger 62 is utilized to supply the operating force for a pair of pivotal arms 64 having generally spatulate egg-penetrating blade portions 64a located adjacent the ends of the cage fingers. Each arm 64 is pivoted on a pin 65, being supported between ears 66 which receive the pin therethrough. The plunger is connected with the respective arms 64 by toggle links 67 which are pinned at one end as by pin 68 to the ends of the arms 64 and at the other as by pin 69 to the extensions 70 on the plungers. The length of links 67 is such that even when the plunger is in its fully extended position (FIG. 9), the pivot pin 68 lies outside a line drawn through pins 69 and 65. Thus, whenever the plunger 62 is displaced inwardly on its boss, the links 67 serve to effect pivoting of the arms 64 in a direction to close the blade portions 64a thereof toward one another and into the relative positions of FIG. 10.

Automatically operating latch means are provided for releasably locking the plunger 62 in the position corresponding to the "closed" condition, as just described, of the blades 64a. The latch means comprises for each element 51 a pivotal latch member 71 having the head portion 71a which is pivotally received by means of a pin 72 within an opening 52c in the enlarged portion 52a of member 52. The latch member extends in a direction parallel with the axis of plunger 62 and has its intermediate portion loosely received between a pair of spaced, parallel ears 73 projecting laterally from and formed integral with the plunger 62. A hook-like slot 74 having a laterally offset notch portion 74a is formed in the latch. In this latch slot loosely fits a stationary pin 75 carried by and between ears 73. The latch member is biased about its pivot pin 72 toward the plunger 62 by a double torsion spring 77 (FIGS. 7 and 9) having the stationary end 77a and the latch engaging end 77b.

Outwardly of the central latching portion, the latching member is provided with the edge 71b for engagement with a camming means subsequently to be described.

It will be observed that each pair of elements 51 is mounted to its carrying flange 37b so that the end cage portions 56 are in opposed, generally confronting relationship. The members 52 are biased toward a separated condition for the cages by a torsion spring 78. The overlapping flat sections 54a which receive the pivot bolt merge in each case with thicker portions and the thicker portions meet at 79 to serve as cooperating stops to limit the degree of separation of the cage portions.

It will be noted that the orientation of the blade arms 64 on the elements 51 is such that when a pair of elements are mounted in opposed relationship and the cages brought together in axially confronting alignment (FIG. 4 and broken lines of FIG. 7) the blades 64a of the two elements can occupy substantially the same vertical plane without interference. For reasons later set forth, the blade arms are also so located on the units that the lowermost blades are at all points above the lowermost point on an egg engaged in the cages. The end contacting fingers 56a of the cages are not so long as to extend past the longitudinal midpoint of an egg engaged therein. As a matter of fact, they need only be long enough to insure that when closed on the oposite ends of an egg, they will support it firmly enough that the egg can be carried therebetween without any other support necessary.

As we have earlier seen, carrier C is supported on the spaced shafts 28 and 29, located respectively at the right and left hand ends of the over-all mechanism, as viewed in FIGS. 1 and 2. Power is supplied to drive the carrier by a motor 80 connected with the speed reducer 81 having the output shaft 82. The motor can be supported in any convenient fashion, the motor platform 83 being provided as a part of the basic framework in the illustrated embodiment. A drive chain 84 drivingly connects output shaft 82 with a sprocket 85 on the end of carrier shaft 29.

The direction of drive is such that the units P, when on the upper flight, move to the right and proceed down around sprockets 30 and back to the left along the lower flight. During the movement along the upper flight, the units P are in an open condition with the cages 56 widely separated and the rollers 55 thus relatively close together, as shown in FIG. 4. As each unit approaches the right end of the unit in preparation for its descent around sprockets 30 and toward the lower flight, the rollers move into juxtaposition with the opposite side faces of a disc member 86 secured to and rotating with shaft 28. This disc is located on the shaft equidistant between the sprockets 30 and the edges of the disc are preferably beveled to assure of elimination of any interference between the rollers and the edges of the disc. During the movement of the units P down around the sprockets 30, the latch members 71 are brought into contact with spaced parallel stationary camming members 87 (FIGS. 1 and 2). These camming members are generally of crescent shape and have outer surfaces which are non-circular with respect to the axis of shaft 28; in other words, they spiral slightly outwardly so as to assure that as the units P move around the sprockets, a radially outwardly directed force corresponding to that of arrow X in FIG. 11 will be applied to the latching member and the latching member will be displaced outwardly about its pivot.

Referring now to FIG. 3 in particular, it will be noted that the leading curved portions 48c of the camming bars 48 are disposed adjacent the faces of disc 86 and are so formed that a smooth transition is provided between the flat side faces of the disc and the respective outer faces of the camming bars. The camming bars are located in the path of the rollers 55. Therefore, as the rollers move around the disc and reach the camming bars, they will be engaged thereby and progressively separated by the curved portions 48a, thereby moving the elements 51 to the full closed position shown in the lower portion of FIG. 4 and in broken lines in FIG. 7. The straight parallel portions of the camming members 48 continue to engage and hold the rollers 55 separated, and thus the units P in the closed position, until the trailing curved portions 48d of the bar are encountered.

It will be noted that located adjacent the path of units P, particularly the egg holding cage portions 56, as the units advance along the lower flight is a cracking blade 88. This blade is a cam operated blade, being worked in response to the rotation of a rotary cam 89 which is driven by a chain 90. The blade is pivotally supported on a shaft 91 and is resiliently biased toward the "up" position by spring 92. A follower 93 rides on the cam, the blade snapping upwards as the follower reaches each drop off on the cam. The cam drive is synchronized with the rate of movement of units P so that as each unit moves into position above the blade, the latter is snapped upwardly to form a slight starting crack in the egg shell approximately at the center thereof. The cracking mechanism is supported in any convenient fashion such as on the pedestal 94.

As earlier noted in a general way, the feeding of the eggs to the central mechanism PM is accomplished in the preferred embodiment by the conveying and feeding apparatus F. The principal function of the apparatus F is to maintain an oncoming supply of eggs arranged in single file and to hold an egg in supported position between the cages 56 as these are closed toward one another in response of movement of the unit P past the leading ends 48c of the camming bars.

The feeding and positioning component of the mechanism F comprises the single endless roller link chain 95 (FIGS. 1 and 5) having located thereon at spaced intervals the egg cradles 96. The chain 95 is supported in a vertical plane and trained about sprockets 97, 98. Its upper flight passes over an apron or guide 99 which serves to provide a straight horizontal path for the respective cradles during the time they are in registry with the oncoming pick-up units P. The apron is carried on a shaft 100 extending between side frame members 101.

The sprocket 98 is mounted on a shaft 102 journaled between the side frame members 101 in bearings 103. The opposite sprocket 97 is carried on a shaft 104. This shaft is supported in bearings 105 mounted to supports 106.

Figure 5:
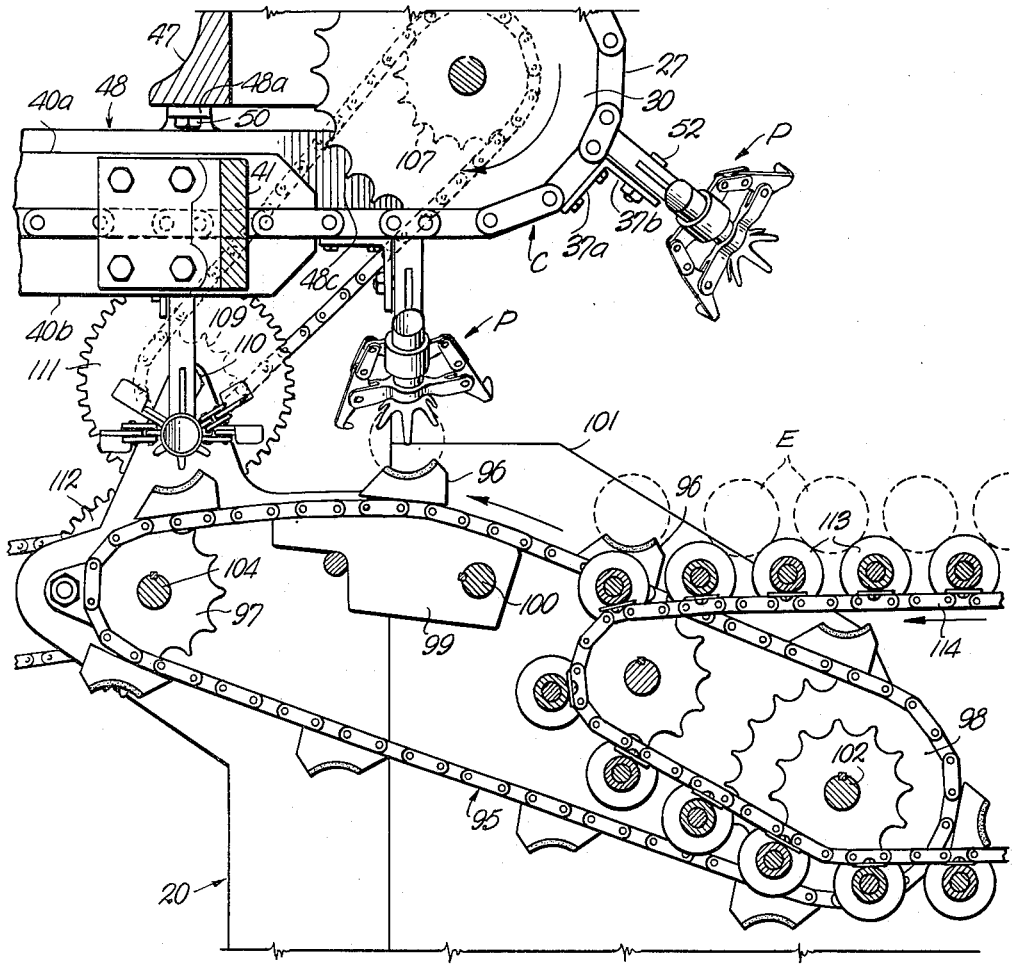
FIG. 5 is an enlarged fragmentary sectional view taken generally along line 5—5 of FIG. 1 in the direction of the arrows.

The feed chain 95 is driven in proper synchronization with carrier C by drivingly connecting it with the end shaft 28 of the carrier. As seen in FIGS. 1 and 5, a sprocket 107 is secured to shaft 28. An endless chain 108 connects sprocket 107 with a sprocket 109 on a shaft 110 which carries the gear 111. Gear 111 meshes with a similar gear 112 which is secured to the shaft 104 to which conveyor sprocket 98 is connected. The gears provide the reversal of direction of motion necessary to correlate the direction of movement of the feed conveyor chain 95 with the pick-up carrier C.

In the preferred embodiment, the cradle conveyor chain 95 is positioned so as to rise between and successively pick eggs from the rollers of a roller conveyor having the rollers 113. These rollers are carried by endless chains 114 and an egg is supported between adjacent pairs of rollers. The cradle chain 95 rises between the rollers and through means not pertinent to the present application is so synchronized with the movement of the rollers as to cause lifting of an egg by each cradle as it rises between the rollers. However, any other way of loading the cradles can be utilized without affecting the resent invention and the roller conveyor is, therefore, not further described.

Figure 12:
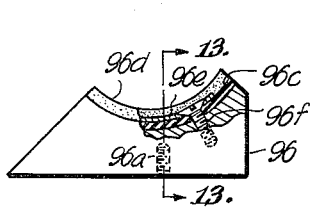
FIG. 12 is an enlarged side elevational view of a cradle unit, parts being broken away for purposes of illustration.
Figure 13:
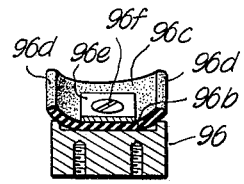
FIG. 13 is a sectional view taken along line 13—13 of FIG. 12 in the direction of the arrows.

The details of the individual cradles 96 are shown in FIGS. 12 and 13. The cradles are secured to the chain 95 by plates on the chain, threaded apertures 96a being adapted to receive mounting screws (not shown). Each cradle has the concave upper surface 96b in which is received a rubber or other resilient member 96c providing the rib-like parallel edges 96d. The edges 96d are arcuate so as to conform generally to a curvature of the egg. Member 96c is held in position by the clamp plate 96e and its associated screw 96f. The rib-like edges 96d engage the egg and lift it from the rollers 113.

Returning now to the left hand side of the central mechanism PM and referring to FIGS. 2 and 3 in particular, it will be seen that positioned on each side of the lower flight of units P and substantially coincident with the commencement of the trailing incurved portions 48d of camming bars 48 is a roller cam 115. Each roller cam is supported from a mounting member 116, the mounting member for the inside roller cam being supported from the spacer 44 and the member for the outside roller cam from the rear post 21. These rollers are so positioned and so dimensioned that a portion of the rim thereof lies in the path of the advancing plungers 62 on the opposite sides of the units P and is operable to engage the plungers at substantially the same time that rollers 55 start inwardly on camming bar sections 48d. The deflection of the plungers caused by cam rollers 115 must be such as to result in engagement of each latching member 71 in its locked position illustrated in FIG. 11.

As previously mentioned, the separating mechanism CM is designed to receive the contents of the eggs as they are successively broken and opened by the mechanism PM. While the details of its construction and operation are not claimed in this application, nevertheless it will perhaps be helpful in understanding the operation of the mechanism PM to know that the collectors S are mounted on an endless carrier 117 in the form of a chain trained at one end around a sprocket 118. The collectors move at equal linear speed with the pick-up units P, being connected with the drive for the latter through a chain 119 and gears 120, 121. Each collector S has a top cup 122 which is arranged and positioned during operation to receive the contents of an egg opened by a corresponding pick-up and breaking unit P.

In describing the operation it will be understood that the motor 80 is energized and is driving the carrier C and the units connected therewith at the proper operating speed. As a result, the units P are moving generally clockwise on their carrier C. Eggs E are being advanced by the conveyor F to the cradle chain 95, and the cradles 96 of the chain 95 serve to pick the eggs successively from the roller conveyor and move them toward merger with the units P.

Each unit P, as it moves into registry with a cradle 96 and the egg thereon, is in the condition where its components have the relationship with one another illustrated in solid lines in FIGS. 6 through 9. In other words, plungers 62 are to their full extended position, latching members are unlatched and the end engaging cages 56 are widely enough separated as to permit the unit P to move into the horizontal tract of the lower flight with the cages 56 in spaced relation from the opposite ends of the egg.

The cradle conveyor and carrier C move at synchronized rates so that a unit P registers with a cradle 96 during the spreading movement of rollers 55 on the cam surfaces 48c. As a result, the pivoting of the elements 51 about their pivot bolt 52 which is caused by the roller brings the cage fingers 56a into surrounding engagement with the opposed ends of the eggs. The springs 61 limit the end pressure that may be applied to the egg by the cage fingers and also provide a means of assuring that eggs of varying length can be handled without difficulty. The cages 56 can shift axially relative to one another because of the displaceable rods 57, the springs 61 serving to bias the cages at all times toward gripping engagement with the eggs. Preferably, the length of rods 57 is such that upon closing of the elements 51 to grip even the shortest egg for which the machine is designed, the rods will be displaced somewhat so that the heads 57a will be separated slightly from the respective shoulders in the counter bores 60 against which they normally seat.

Once an egg has been closed upon by the pick-up unit, the cradle 96 drops away and the egg continues its movement along the lower flight of the carrier in a linear horizontal path being supported by the cages 56 of the pick-up units. At this time, the blade arms 64 are in the retracted position for the blades 64a. This is the condition illustrated in FIGS. 6 through 9 and for the most part in FIG. 3.

As the egg is moved on through the position directly over the cracking blade 88, the cracking blade snaps upwardly to provide a starting crack or bite in the shell at a central location.

The completion of the severing of the shell into two halves is accomplished through interengagement of the roller cams 115 with the respective plungers 62 on each unit P. It will be noted that the beveled facets 62b on the ends of the plungers are oriented so that they encounter the periphery of the cam. As the unit moves past the cam, the cam surface serves to displace the plungers inwardly. This, in turn, causes the blade arms 64 to pivot to bring the blades 64a into penetrating engagement with the egg shell. The spatulate character of the blades 64a causes them to act substantially conjointly as a knife. As a result, substantially complete and clean severance of the shell into two halves is accomplished.

Figures 10, 11:
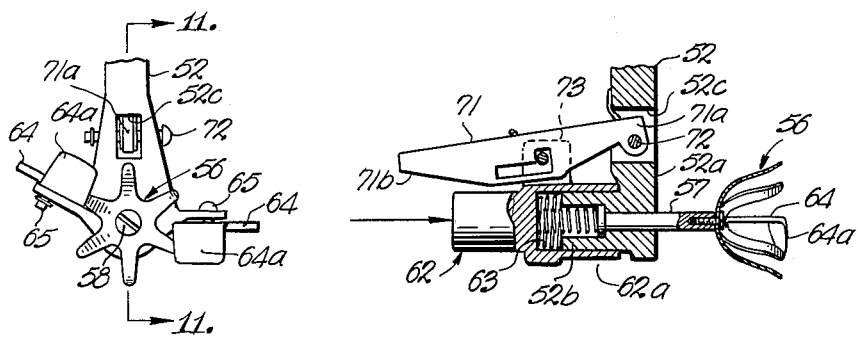
FIG. 10 is a view similar to FIG. 8 but showing the shell-piercing blades of the pick-up and breaking unit in closed shell-penetrating condition.
FIG. 11 is a sectional view taken along line 11—11 of FIG. 10 in the direction of the arrows.

The closing of the blades 64a into the shell takes but an instant. It is accomplished by the automatic latching of the latch member 71 to lock the plunger in the depressed condition which conforms to the condition in which the blades 64a are closed into the egg shell. When the plunger is moved in by the roller cam 115, the latching notch 74a of the latching member is moved into registry and holding engagement with pin 75 (as illustrated in FIGS. 10 and 11) when sufficient inward displacement of the plunger to bring the pin into registry with the notch has taken place. Thereafter, as the rollers ride inwardly on cam bar sections 48d, the elements 51 pivot to move the opposed cages 56 thereof apart and upwardly causing the contents of the egg to escape by gravity. The blades 64a serve to hold the shell halves in the cages 56 during the separation of the shell halves and until they are later released as will be explained.

It is a valuable feature of our invention that we are able to obtain substantially complete clean out of the shell sections despite the rapid pace at which the eggs are moved through the mechanism. This is due to several factors among which are the rapid separation of the shell halves effected as the rollers 55 move inwardly on the trailing portions 48d of the camming bars, the substantial distance which the shell halves are separated and the appreciable tilting of the open ends of the shell halves downwardly as they are moved apart. The location of the pivot axis for the elements 51 to the inside of vertical lines through the cages 56 provides a greater vertical component of movement for the cages than would be the case should the two elements 51 be independently supported somewhere along the respective axis of their shanks 53.

It will be observed that the units P are opened well in advance of the end of the lower flight of the carrier C so that the separation of the egg contents from the shell takes place while the units P are still moving in a straight line path. The breaking and separation of the shell takes place with a collector S in position below and moving at equal speed with the units P. Even though the units may be moving at high speed, the linear motion assures that there are no forces at work other than gravity and, therefore, the egg contents tend to stay together in a compact mass in the transition from the shell to the collectors S.

As the units P move upward around sprockets 31 toward the upper flight, they carry the empty egg half shells E' (see FIG. 4) with them. The shell sections continue to be carried by the unit across the upper flight because of the continued latching of the plungers 62 in the "in" position with the blades 64a in holding engagement with the ends of the half sections. However, as the units move down around sprockets 30 toward the egg intercept position, the latch members 71 are engaged by cams 87, as earlier described, thus to trip the latch members and release the plungers 62 and cause their return under the influence of spring 63 to the normal position of FIGS. 6 through 9 inclusive. This in turn retracts the blades 64a thus freeing them from the shell sections and the shell sections are delivered into the collector SC. Since the rods 57 have been held in a slightly depressed condition by engagement of the blades with the shell, the spring 61 snaps the rod 57 outwardly and this, along with the "jar" effect occurring on the release of the plungers 62, assures the rejection of the shell halves from the cages 56. Each unit P is, therefore, reset for operation as it moves past cams 87 and the cycle can now be repeated.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for breaking and opening egg shells to release the contents thereof comprising an endless flexible carrier having an upper flight and a lower flight, means for driving said carrier, bracket members spaced serially along said carrier, egg pick-up units individually mounted on said bracket members and each comprising a pair of pivotal elements carrying opposed open ended and confronting egg contacting cages, said cages operable, on pivoting of said elements, to move toward one another and to engage the respective ends of an egg located therebetween, each said element having a cam follower thereon, means resiliently biasing said pairs of said elements toward an open separated condition for said cages, and stationary camming means supported adjacent said lower flight and in the path of said cam followers, said camming means and followers cooperating to pivot said elements to close said cages toward one another in response to movement of said pick-up units by said carrier along said lower flight and to hold same closed for a selected portion of the travel along said lower flight.

2. Apparatus for breaking and opening egg shells to release the contents thereof comprising an endless flexible carrier having a lower flight and an upper flight, means for driving said carrier, bracket members spaced serially along said carrier, egg pick-up units individually mounted on said bracket members and each comprising a pair of pivotal elements carrying opposed egg contacting cages, each said element having a cam follower thereon, and stationary camming means supported adjacent said lower flight and in the path of said cam followers, said camming means and followers cooperating to effect pivoting of said elements to move said cages toward and away from one another in a predetermined pattern as said units advance along said lower flight, each of said elements further including movable egg penetrating blades normally positioned in non-penetrating position and operating means for effecting movement of said blades to a penetrating position, and second camming means positioned adjacent said lower flight and operable to actuate said operating means upon passage of a unit thereby.

3. Apparatus as in claim 2 wherein said second cam means is positioned to cause movement of said blades to said penetrating position just prior to the opening of said cages.

4. Apparatus as in claim 2 wherein each said element includes latch means operable to releasably latch said blades in said penetrating position in response to actuation of said operating means.

5. Apparatus as in claim 4 including third camming means operable at a point along the path of said pickup units to engage and release said latch means.

6. In apparatus for breaking and opening egg shells to release the contents thereof, the combination of a pair of elements of substantially identical construction pivotally supported on a common pivot axis but arranged so that the elements are in opposed tong-like orientation, each said element comprising a shank portion offset from said pivot axis and having a cam follower at one end and a head portion at the other end, a movable member connected with said head portion, an egg contacting cage carried by said movable member, and means resiliently biasing said movable member toward an extended position for the cage, and other means resiliently biasing said elements so that the head portions are normally substantially spaced from one another.

7. In apparatus for breaking and opening egg shells to release the contents thereof, the combination of a pair of elements of substantially identical construction pivotally supported on a common pivot axis but arranged so that the elements are in opposed tong-like orientation, each said element comprising a shank portion offset from said pivot axis and having a cam follower at one end and a head portion at the other end, a movable member connected with said head portion, an egg contacting cage carried by said movable member, means resiliently biasing said movable member toward an extended position for the cage, movable egg-penetrating blades normally positioned in non-penetrating condition, and operating means for effecting movement of said blades to a penetrating condition.

8. In apparatus for breaking and opening egg shells to release the contents thereof, the combination of a pair of elements of substantially identical construction pivotally supported on a common pivot axis but arranged so that the elements are in opposed tong-like orientation, each said element comprising a shank portion offset from said pivot axis and having a cam follower at one end and a head portion at the other end, a movable member connected with said head portion, an egg contacting cage carried by said movable member, means resiliently biasing said movable member toward an extended position for the cage, movable egg-penetrating blades normally positioned in non-penetrating condition, operating means for effecting movement of said blades to a penetrating condition, and latch means operable to releasably hold said blades in said penetrating condition.

9. Apparatus for breaking and opening egg shells to release the contents thereof comprising an endless flexible carrier having a lower flight and an upper flight, means for driving said carrier, bracket members spaced serially along said carrier, egg pickup units individually mounted on said bracket members and each comprising a pair of pivotal elements carrying opposed and confronting egg contacting cages operable, when closed toward one another, to engage in the cages the respective ends of an egg located therebetween, each said element having a cam follower thereon, stationary camming means supported adjacent said lower flight and in the path of said cam followers, said camming means and followers cooperating to effect pivoting of said elements to move said cages toward and away from one another between closed, egg holding and open, shell separating conditions in a predetermined pattern as said units advance along said lower flight, and means cooperating with said elements and said cages and operable to releasably retain the opened shell fragments in said cages when said elements are in said shell separating condition.

10. Apparatus as in claim 9 wherein said cages are supported on said elements for limited movement with respect thereto, and including resilient means biasing said cages toward one another relative to their respective elements.

11. Apparatus for breaking and opening egg shells to release the contents thereof comprising and endless flexible carrier having a lower flight and an upper flight, means for driving said carrier, a plurality of egg pickup units spaced along and serially connected with said carrier, each said pickup unit comprising a pair of pivotal elements carrying opposed and confronting egg contacting cages and operable, when closed toward one another, to engage in the cages the respective ends of an egg located therebetween, each said element having a cam follower thereon, stationary camming means supported adjacent said lower flight and in the path of said cam followers, said camming means and followers cooperating to effect pivoting of said elements to move said cages toward and away from one another between closed, egg holding and open, shell separating conditions in a predetermined pattern as said units move along said lower flight, and means cooperating with said cages and operable to releasably retain the opened shell fragments in said cages when said elements are in said shell separating condition.

References Cited by the Examiner
UNITED STATES PATENTS

| | | | |
|---|---|---|---|
| 1,082,557 | 12/1913 | Rudolphi. | |
| 1,686,174 | 10/1928 | Rauschenberger. | |
| 1,775,918 | 9/1930 | Smith | 146—52 |
| 1,945,788 | 2/1934 | Pilley | 146—2 X |
| 2,443,188 | 6/1948 | Hodson | 146—2 |
| 2,524,844 | 10/1950 | Smith | 146—2 |
| 2,682,900 | 7/1954 | Whitehead | 146—3 |
| 2,772,711 | 12/1956 | Carroll | 146—28 X |
| 2,966,184 | 12/1960 | Willsey | 146—2 |
| 3,133,569 | 5/1964 | Shelton et al. | 146—2 |

ROBERT C. RIORDON, *Primary Examiner.*

J. SPENCER OVERHOLSER, *Examiner.*